United States Patent [19]

Smith et al.

[11] Patent Number: 4,502,793
[45] Date of Patent: Mar. 5, 1985

[54] APPARATUS AND METHOD FOR MEASURING TEMPERATURE PROFILE

[75] Inventors: Kenneth B. Smith, Tuffley; Derek W. Adams, Cheltenham, both of England

[73] Assignee: Schlumberger Electronics (UK) Limited, Farnborough, England

[21] Appl. No.: 443,989

[22] Filed: Nov. 23, 1982

[30] Foreign Application Priority Data

Nov. 25, 1981 [GB] United Kingdom ................ 8135559

[51] Int. Cl.$^3$ ............................ G01J 5/10; G01J 5/08
[52] U.S. Cl. ...................................... 374/124; 374/2; 374/137; 374/166; 374/167; 73/159
[58] Field of Search ............... 374/1, 2, 137, 166, 374/167, 124, 129, 121, 110, 130; 356/43; 73/159; 250/252.1

[56] References Cited

U.S. PATENT DOCUMENTS

| 2,162,614 | 6/1939 | Fry ........................................ 374/1 |
| 3,655,980 | 4/1972 | Bossen .................................. 73/159 |
| 3,670,568 | 6/1972 | Kubo ..................................... 73/159 |
| 3,681,595 | 8/1972 | Dahlin ............................... 250/252.1 |
| 3,782,192 | 1/1974 | Sandblom ............................ 73/159 |
| 4,032,975 | 6/1977 | Malueg et al. . | |
| 4,225,883 | 9/1980 | Van Atta et al. . | |
| 4,285,745 | 8/1981 | Farabaugh ........................... 73/159 |

FOREIGN PATENT DOCUMENTS 2068109  8/1981  United Kingdom .

OTHER PUBLICATIONS

Peter Bohlander, "Determination of Position Size and Temperature Distribution of Hot Rolling Stock with the Aid of Self-scanning Photodiode Lines", Stahl und Eisen, No. 19 of 1977, Sep. 22, 1977, pp. 927–932.

Primary Examiner—Charles Frankfort
Assistant Examiner—Denis E. Corr
Attorney, Agent, or Firm—Dale Gaudier

[57] ABSTRACT

A camera contains a row of diodes sensitive to infrared radiation and mounted on a turntable for rotation about the optical axis of the camera. The signals from the diodes provide a temperature profile of a band across the width of a strip of hot rolled steel moving in a direction orthogonal to the optical axis and to the length of the row of diodes. Since the diodes are low accuracy devices, their measurements are compensated by normalizing co-efficients derived by comparison with the signal provided by an optical pyrometer viewing the central part of the steel strip in the region of the optical axis. To enable all diodes to be calibrated, calibration is effected with the turntable rotated 90° to align all the diodes with the central part of the strip as viewed by the pyrometer. The camera may be mounted on one arm of a C-frame having X-ray tubes in an arm and X-ray detectors in the other arm for the purpose of measuring the thickness profile of the strip in known way. The compensated temperature measurements can then be used to correct the corresponding thickness measurements to take account of the variation in apparent thickness with density, and hence temperature.

9 Claims, 5 Drawing Figures

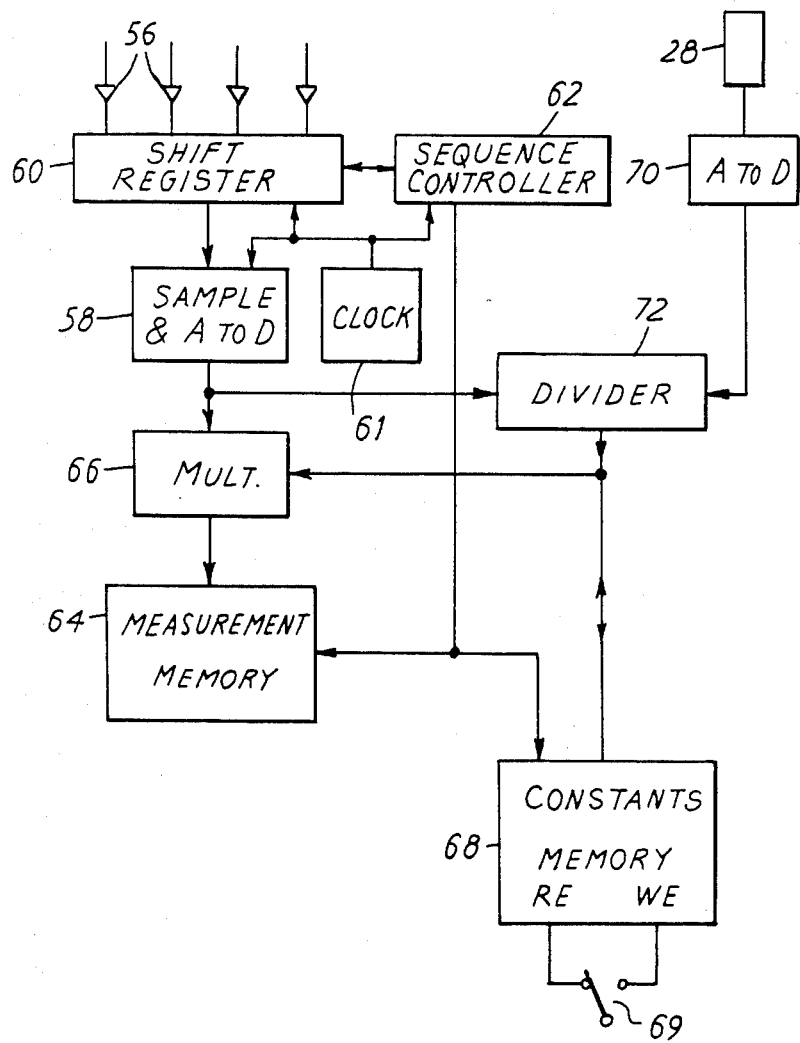

APPARATUS AND METHOD FOR MEASURING TEMPERATURE PROFILE

BACKGROUND OF THE INVENTION AND PRIOR ART

The present invention relates to apparatus and a method for measuring the temperature profile across the width of a strip of moving material, e.g. hot steel strip. By way of background to the invention, one example of its practical utility in a hot strip mill will be explained, although the invention is not restricted to such use.

In hot strip mills, it is known to monitor the thickness profile of the strip, in order to effect corrective adjustments of the roll stands when necessary, by projecting a fan beam of X or gamma rays through the strip to a row of detectors extending across the width of the strip. See our U.S. Pat. No. 4,047,036 for details of such a system. The intensity of radiation received at a detector is given by the following equation:

$$I = I_0 e^{-upx},$$

where:

I = received intensity
$I_0$ = incident intensity
u = mass absorption coefficient
p = density
x = thickness.

Since p is a function of temperature, namely an approximately linear inverse function, the thickness x indicated by measuring I is influenced by temperature. The hotter the strip, the thinner it appears. However, it is the "cold thickness", i.e. the thickness of the strip when cold, that is normally required. It is known to derive this by measuring the temperature of the strip and calculating its cold thickness from its measured thickness using an equation of the form:

$$x' = A \times (1 + BT) \tag{1}$$

where:

x' = cold thickness,
T = temperature, and
A and B are constants.

However, a single measured temperature does not lead to satisfactory compensation because there is significant temperature variation across the width of the strip metal which naturally cools more rapidly at the edges of the strip. There can also be cool bands away from the edges, arising from preferential cooling of the billet before entry into the mill stands. It would therefore be desirable to measure the temperature profile so that there is a separate value of T for correcting each thickness measurement, or at least sufficient values of T to provide a sufficiently accurate measurement for each detector in an arrangement where each value of T pertains to a band of the strip covering a group of the detectors.

It is possible to make temperature measurements using a diode array. The use of radiation responsive diodes to measure temperature is known and arrays of diodes are available which respond to infra-red radiation emitted from bodies above around 700° C. However such diodes do not provide an inherently accurate measurement and need to be calibrated against a standard such as a radiation pyrometer. The number of diodes in an array must be very large, say 1000 diode elements, and calibration of so many diodes presents problems. Instead of diodes, a charge coupled device (CCD) may be used. Again calibration is necessary.

SUMMARY OF THE INVENTION

In accordance with the method and apparatus of the invention the row of diodes or other elements sensitive to thermal radiation is rotatably mounted so that it can be rotated between a first position transverse to the strip and a second position aligned with the direction of movement of the strip. The first position is the normal position employed to take individual temperature measurements from the diodes, for use in correcting thickness measurements for example. The second position is used when calibrating the diodes. Since the diodes all then look at the same zone of the strip, such as the centre line of the strip, they can all provide simultaneous calibration outputs to be compared with a reference signal generated by a standard device, such as a radiation pyrometer looking at the same zone of the strip.

It is therefore a broad object of the invention to provide a method of and apparatus for measuring the temperature profile across the width of a strip of moving material.

It is another object of the invention to provide such a method and apparatus which enables radiation sensitive elements to be readily calibrated.

It is a more specific object of this invention to provide apparatus which is adapted for easy calibration without the need for great complexity or expense.

In the case of a diode array, each diode is one element sensitive to thermal radiation. In the case of a CCD, each photosite acts as an individual element sensitive to thermal radiation.

BRIEF DESCRIPTION OF DRAWINGS

The above and other objects and advantages of the invention will become apparent from the following description of a preferred embodiment given by way of non-limitative example, with reference to the accompanying drawings, in which:

FIG. 5 is a block diagram of an electrical circuit of the apparatus.

FIG. 1 is a view along the direction of movement of a steel strip 10 shown with an exaggerated non-uniform thickness profile. The apparatus comprises a C-frame 12 on a track 13 which permits the C-frame to be wheeled up to the strip on wheels 15 so that the strip lies in the space between the upper limb 14 and the lower limb 16 of the C. The upper limb contains one or more X-ray tubes in a housing 17 directing fan beams 18 of radiation down through the strip with the wide dimension of the fans transverse to the strip. The fan beams are incident on a row of detectors in the lower limb C. The tubes and detectors are not shown; their details form no part of this invention and they are described in the aforementioned patent specification.

Figure 1:
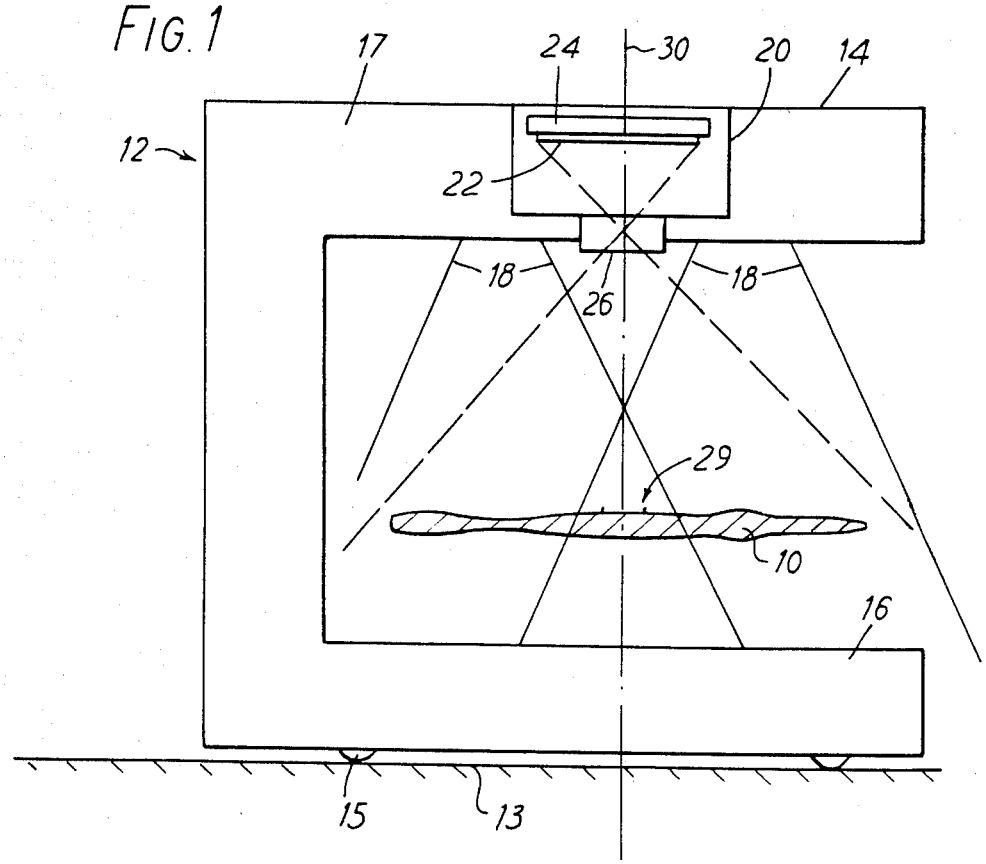
FIG. 1 is a schematic elevation of the apparatus.
Figure 2:
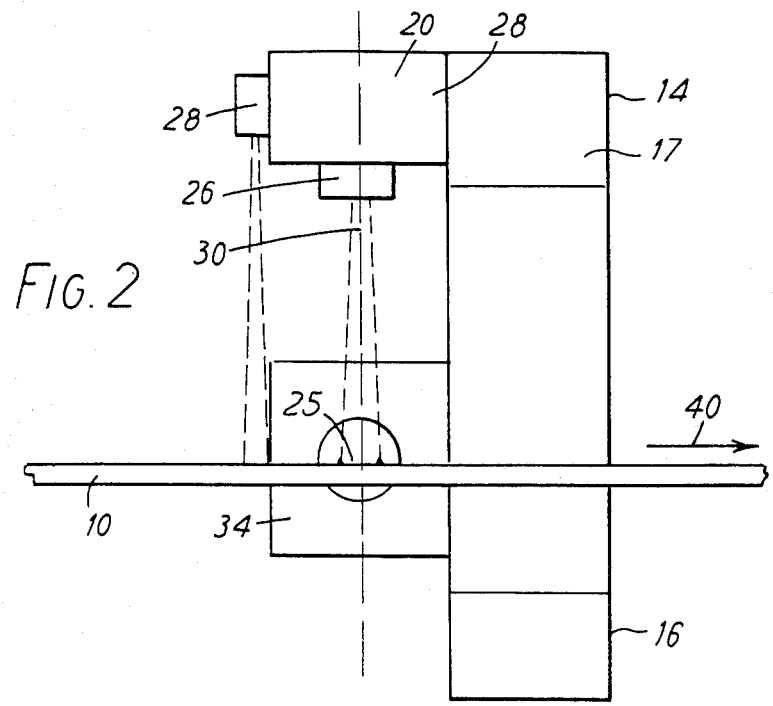
FIG. 2 is a schematic elevation taken from the right in FIG. 1.

Alongside the tube housing 17 is a camera housing 20 (see also FIGS. 2 and 3) which contains a row 22 of diodes, also called a diode array, mounted on a turntable 24. An image of a transverse stripe 25 extending across substantially the whole width of the steel strip 10 is focused on to the diode array 10 by a lens 26. Also attached to the tube housing 17, substantially vertically above the centre line of the strip, is an optical radiation pyrometer 28 (FIG. 2) which observes a central region 29 (FIG. 1) of the strip. This region 29 is in line with the optical axis 30 of the camera and the turntable 24 rotates about this axis.

Figure 4:
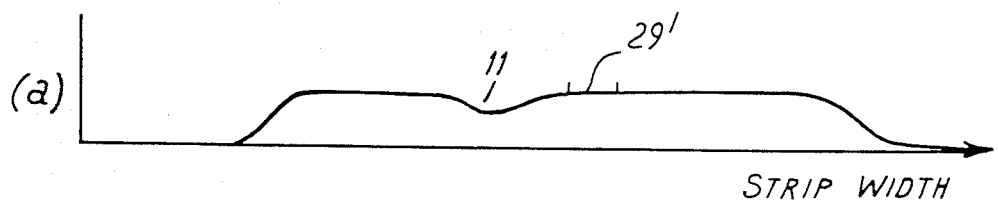
FIG. 4 shows diagrams of waveforms representing diode outputs.

The diode array 22 is, except when being calibrated, transverse to the steel strip 10 and the envelope of the diode outputs will have a form as specified by waveform (a) of FIG. 4 where diode outputs are plotted as a function of distance across the strip width. The fall off in temperature at the strip edges is apparent and it is assumed that the strip has a cool band producing a dip 11 in the waveform. The part of the waveform corresponding to the central region 29 is denoted 29'. The width of the steel strip can be determined from the waveform (a).

The fragmentary view of FIG. 5 shows the camera 20 on the X-ray tube housing 17. An arrow 40 indicates the longitudinal direction of movement of the steel strip and the transverse axis is denoted 42. The diode array 22 is shown aligned along this axis. By rotating the turntable 24 (FIG. 1) through 90°, the diode array can be aligned in the longitudinal direction 40, as indicated at 22', so that all diodes observe the same narrow band of the steel strip 10, and therefore should all indicate the same temperature, namely the temperature indicated by the pyrometer 28, since the said narrow band is in line with the central region 29.

The signals from the diodes of the array 22 are processed as will be described with reference to FIG. 5. Firstly, a brief statement of the principle involved will be given. To effect calibration, the turntable 24 is rotated to align the diodes of the array 22 along the longitudinal axis and with the central region 29, so that they all observe the same temperature, which is also the temperature observed by the pyrometer 28.

The pyrometer 28 could be inside the camera housing 20 and share some of the camera optics.

Normalizing constants are formed for each diode individually to match their outputs with that of the pyrometer and these constants are stored and used to multiply the diode signals thereafter which the diode array has been turned back in line with the transverse axis 42.

Although an analogue implementation is possible, for example using tri-state latches for the normalizing constants along the lines of the circuit described in the aforementioned patent specification, a digital implementation is preferable in current technology and especially in order to deal with a large number of diodes. Accordingly FIG. 5 shows a representative four diodes 56 of the array 22 connected to a digitizing sampler 58 by way of a shift register 60. There may be 1000 diodes with a sampling rate of 1 MHz established by a clock pulse source 61 so that a complete sampling cycle takes 1 ms. Linear diode arrays with a shift register are commercially available as integrated, single chip devices. The timing of the strobing of data in parallel into the shift register 60 and of the start of reading out the data are controlled by a sequence controller 62 which also receives the clock pulses. It would also be possible to use a simple diode array in conjunction with a separate shift register or multiplexer controlled by the sequence controller 62 to provide the serial input to the sampler 58.

Assuming for simplicity that there is no integration over sampling cycles, a 1k byte memory 64 suffices to store the samples from all diodes, allowing 8 bits per sample. The controller 62 addresses the locations in the memory in synchronism with operation of the shift register 60. In normal operation, before the samples are written in to the memory 64, they are multiplied in a multiplier 66 by individual normalizing constants read out of a second memory 68 under synchronous control by the controller 62.

The memory 64 therefore contains normalized digital measurements individual to all the diodes and these measurements may be employed in various ways. In the first place they can be employed to provide a measurement of strip width. Secondly they may be read out and converted to an analogue, video waveform which can be used to display the temperature profile of the steel strip. This will provide a visual indication of any cold bands in the strip. However, such bands may also be detected by signal processing to detect temperature measurements in the memory 64 less than a predetermined proportion, say 80 or 90% of the mean of the measurements. All such operations are simple data processing procedures which can readily be implemented by a digital designer, e.g. using a suitably programmed microprocessor. Knowledge of cold bands will enable corrective action to be taken by repositioning or reheating billets, for example.

Finally, the temperature measurements can be used to correct the x measurements provided by the radiation detectors in the lower arm 16 of the C-frame 12, in the manner explained in the introduction to this specification. This again is a simple, readily implemented arithmetical operation (Equation 1). It is convenient to use a diode array 22 with many diodes, in order to get an array of adequate length. The number of radiation detectors will be much smaller and therefore the measurements from groups of diodes must be averaged into a smaller number of measurements. For example, measurements from 1000 diodes can be averaged in groups of 50 to serve 20 radiation detectors. Such averaging may be effected on the values read out from the memory 64 but it is preferred to use only 20 locations in the memory, each of several bytes capacity, and to accumulate into each the samples from all diodes of the corresponding group and moreover to do this over a series of sampling cycles to obtain an average measurement. The multiplication by normalizing constants may be effected, as described, before writing the measurements into memory or after reading them out. Many other variations in detailed implementation are clearly possible. The memories 64 and 68 need not be separate entities and the multiplier 66 can be implemented by a microprocessor and software.

Figure 3:
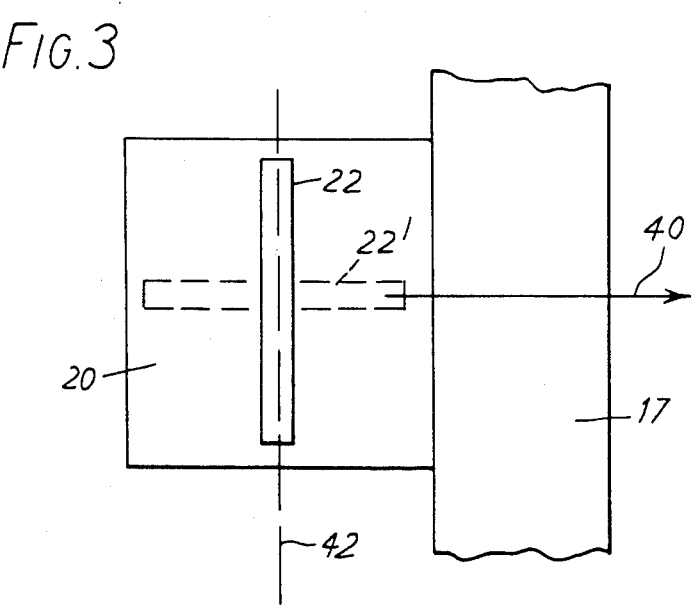
FIG. 3 is a fragmentary plan view of the apparatus.

In order to calibrate the apparatus, i.e. in order to determine the normalizing constants, the diode array 22 is rotated to line up with the longitudinal direction as at 22' in FIG. 3. No means for effecting this are shown. At the simplest, they may be a knob on top of the camera housing 20 but they are preferably a remote controlled actuator, e.g. an electric motor or rotary solenoid. The actuator can then be controlled from a separate console, containing most of the circuitry of FIG. 5, either by a switch on the console or automatically in apparatus constructed to carry out a calibration cycle at periodic intervals.

For a calibration cycle, the mode of the circuit of FIG. 5 is switched by putting the memory 68 in write mode rather than read mode, symbolized by switch 69. The pyrometer signal is converted to digital form by a converter 70. Each raw digital sample from the sampler 58 is divided into the digital pyrometer signal by a divider 72 (again implemented by the microprocessor) to form the corresponding normalizing constant for writing into the memory 68.

During normal operation, the measurements by the pyrometer and the diodes in the region 29 (FIG. 1) should continue to coincide. Drift between these measurements can be assumed to arise from factors (e.g. misting of the camera lens) affecting all of the diodes. Accordingly the measurements can be multiplied during normal operation not only by the individual normalizing constants but also by a common factor, namely the quotient of the pyrometer signal divided by the normalized signal from one of the diodes in the region 29, or an average signal from this region.

A CCD could be used instead of a diode array, in which case the output is inherently serial and the shift register or multiplexer 60 is not required.

The use of normalizing constants, as described above, corrects the slope of the characteristic of each radiation sensitive element. It may also be desired to correct for zero offset by storing a further set of constants to be algebraically added to the measurements. The offset constants can be determined from the dark output, i.e. the output when no radiation is present, and one practical technique is perodically to obscure the aperture of the lens 26 and make the measurements. In the case of a CCD, the same technique can be applied or some photosites may be obscured by metallization so as to provide reference dark output measurements.

The temperature of each element is thus computed as $$T = C + DT_a \qquad (2)$$

where:
T is the corrected temperature used in equation (1),
$T_a$ is the raw temperature measurement,
C is the offset constant, and
D is the normalizing constant.

What is claimed is:

1. A method of measuring the temperature profile across the width of a strip of moving material, wherein an image of the strip is projected on to a row of elements sensitive to thermal radiation extending across the width of the strip thereby to provide electrical signals from said elements, said signals are processed to provide further signals representative of the temperature of a plurality of bands of the moving strip, the processing including normalizing in accordance with stored normalizing constants, and wherein said normalizing constants are determined by comparing the signals from said elements with a temperature reference signal when said row of elements is rotated into alignment with the direction of movement of said strip.

2. Apparatus for measuring the temperature profile across the width of a strip of moving material, comprising a row of elements sensitive to thermal radiation mounted so as to be rotatable about an axis to which the row is transverse, the row being rotatable between a first position in which the row is transverse to the direction of movement of the strip, and a second position in which the row is aligned with the direction of movement of the strip, and signal processing circuitry responsive to electrical signals from the said elements and having a first mode operative in said first position of the row of elements in which signals from groups of one or more of the said elements are normalized in accordance with stored normalizing constants individual to the said groups, and a second mode operative in said second position of the row of elements, to determine said normalizing constants by comparing the signals from the said elements with a reference temperature signal.

3. Apparatus according to claim 2, wherein said elements are diodes.

4. Apparatus according to claim 2, wherein said elements are photosites of a charge coupled device.

5. Apparatus according to claim 2, wherein said signal processing circuitry also stores offset constants determined when at least some of the said elements are covered and combines said offset constants with said normalized signals.

6. Apparatus according to claim 2, comprising a reference element mounted to view the strip in the region of said axis and to provide said temperature reference signal.

7. Apparatus according to claim 6, wherein the row of elements and the reference element are mounted on the first arm of a C-frame having first and second horizontal arms joined by an upright, said axis being vertical, one of the yoke arms carrying a source of penetrating radiation and the other yoke arm carrying a row of detectors sensitive to this radiation.

8. Apparatus according to claim 7, wherein said processing circuitry is responsive to signals from the detectors to provide signals representing the thickness profile of the strip, and to correct these signals in accordance with the corresponding normalized signals from groups of elements.

9. Apparatus according to claim 2, wherein said axis intersects the center of said row of elements.

* * * * *